US010280316B2

(12) United States Patent
Low et al.

(10) Patent No.: US 10,280,316 B2
(45) Date of Patent: May 7, 2019

(54) AQUEOUS, PIGMENTED COATING AGENT, METHOD FOR THE PRODUCTION THEREOF, AND THE USE THEREOF FOR THE PRODUCTION OF MULTILAYER COATS OF PAINT

(75) Inventors: Norbert Low, Neustadt/Aisch (DE); Stephan Schwarte, Emsdetten (DE); Peter Sonntag, Everswinkel (DE); Melina Rutte, Hochberg (DE); Kurt Hupp, Kist (DE)

(73) Assignee: BASF Coatings GmbH, Muenster (DE)

( * ) Notice: Subject to any disclaimer, the term of this patent is extended or adjusted under 35 U.S.C. 154(b) by 430 days.

(21) Appl. No.: 12/600,692

(22) PCT Filed: May 16, 2008

(86) PCT No.: PCT/EP2008/003937
§ 371 (c)(1),
(2), (4) Date: Nov. 18, 2009

(87) PCT Pub. No.: WO2008/141768
PCT Pub. Date: Nov. 27, 2008

(65) Prior Publication Data
US 2010/0151139 A1    Jun. 17, 2010

(30) Foreign Application Priority Data
May 18, 2007    (DE) .......................... 10 2007 023 539

(51) Int. Cl.
| C08K 3/10 | (2018.01) |
| C08K 7/24 | (2006.01) |
| C08L 61/28 | (2006.01) |
| C08L 67/00 | (2006.01) |
| C09C 1/64 | (2006.01) |
| C09D 5/02 | (2006.01) |
| C09D 5/29 | (2006.01) |
| C09D 5/36 | (2006.01) |
| C09D 175/04 | (2006.01) |

(52) U.S. Cl.
CPC .................. *C09D 5/29* (2013.01); *C09C 1/64* (2013.01); *C09D 5/028* (2013.01); *C09D 5/36* (2013.01); *C09D 175/04* (2013.01); *C01P 2004/61* (2013.01); *C08K 3/10* (2013.01); *C08K 7/24* (2013.01); *C08L 61/28* (2013.01); *C08L 67/00* (2013.01)

(58) Field of Classification Search
CPC . C09D 5/29; C09D 5/028; C09D 5/36; C09D 175/04; C09C 1/64; C08K 3/10; C08K 7/24; C08L 61/28; C08L 67/00; C01P 2004/61
USPC ........ 524/439, 441, 589, 590, 591, 839, 840
See application file for complete search history.

(56) References Cited

U.S. PATENT DOCUMENTS

| 5,672,649 A | 9/1997 | Brock et al. |
| 5,968,655 A * | 10/1999 | Hartung ................. B05D 7/572 |
| | | 427/407.1 |
| 5,976,343 A * | 11/1999 | Schlaak ................. B05D 7/577 |
| | | 205/149 |
| 6,620,868 B1 | 9/2003 | Wilke |
| 2005/0238802 A1 | 10/2005 | Friese et al. |
| 2006/0008588 A1 | 1/2006 | Chilla et al. |
| 2007/0071901 A1 | 3/2007 | Avgenaki et al. |
| 2010/0064938 A1 | 3/2010 | Voit |
| 2010/0151139 A1 | 6/2010 | Low et al. |

FOREIGN PATENT DOCUMENTS

| DE | 4009858 A1 | 10/1991 |
| DE | 4301991 A1 | 7/1994 |
| DE | 4437535 A1 | 4/1996 |
| DE | 19914896 A1 | 10/2000 |
| DE | 19948004 A1 | 7/2001 |
| DE | 10010416 A1 | 9/2001 |
| DE | 10053890 A1 | 5/2002 |
| DE | 10043405 C1 | 6/2002 |
| DE | 19845740 A1 | 10/2002 |
| DE | 10223652 A1 | 12/2003 |
| DE | 10240972 A1 | 3/2004 |
| EP | 0826745 A2 | 3/1997 |
| EP | 1591492 A1 | 11/2005 |

(Continued)

OTHER PUBLICATIONS

International Search Report of PCT/EP2008/003937 dated Aug. 6, 2008.

(Continued)

*Primary Examiner* — Patrick D Niland
(74) *Attorney, Agent, or Firm* — Servilla Whitney LLC

(57) ABSTRACT

The invention relates to physically, thermally and physically, or thermally curable aqueous coating compositions comprising A) at least one polyurethane selected from the group consisting of physically curable, thermally self-crosslinking and/or thermally externally crosslinking, ionically and/or nonionically stabilized polyurethanes, which are saturated, unsaturated and/or grafted with olefinically unsaturated compounds, as binder and B) at least one leaflet-shaped metallic pigment produced by PVD (Physical Vapor Deposition) methods, the amount of B), based on the total binder content of the coating composition, being less than 10% by weight, and the total binder content, based on the coating composition, being less than 12% by weight. The invention further relates to a process for producing the compositions and to their use in particular in the production of coatings.

12 Claims, No Drawings

(56) References Cited

FOREIGN PATENT DOCUMENTS

| EP | 2158280 B1 | 8/2011 |
|---|---|---|
| WO | WO2006/017197 A1 | 2/2006 |
| WO | WO2007041228 A1 | 4/2007 |
| WO | WO2007/057200 A1 | 5/2007 |

OTHER PUBLICATIONS

J. Seubert & A. Fetz; PVD aluminum pigments: Superior brilliance for coatings and graphic arts; Eckart-Werke GmbH & Co., D-31235 Velden, Germany; Surface Coatings International Part A Issue Jun. 2001; pp. 240-245.
Written Opinion of PCT/EP2008/003937 filed on May 16, 2005.
Calculation of the examples for EP 908758569.1, BASF, 1 page.
R.D. Cadle, "Particle Size Determination", Interscience Publishers Inc., New York, 1955, pp. 92 to 101.
Eckart guideline formula "76-09005 A" of Apr. 10, 2000, Eckart Effect Pigments, Eckart GmbH, 1 page.
Technical Data Sheet "3H.1837.0" of Apr. 2007, Eckart Effect Pigments, Eckart GmbH & Co. KG, 2 pages.
Notice of Opposition to corresponding EP Patent No. EP2158280 by Bollig & Kemper GmbH, filed May 30, 2012, 28 pages.
English Translation of Grounds of Opposition, Annex 1 to EP Patent No. EP2158280 filed by DuPont, 42 pages.
International Preliminary Report on Patentability for International application No. PCT/EP2008/003937 dated Dec. 7, 2009.
BYK Additives & Instruments Data Sheet, "Laponite RD", Issue Oct. 2013, 1 page.
Goldschmidt, Prof. Dr. Artur et al., "BASF Handbook on Basics of Coating Technology", 2nd Revised Edition, 2007, pp. 703-705.
Klein, Georg A., "Industrial Color Physics", Springer Science+ Business Media, LLC, 2010, pp. 79-80.

\* cited by examiner

AQUEOUS, PIGMENTED COATING AGENT, METHOD FOR THE PRODUCTION THEREOF, AND THE USE THEREOF FOR THE PRODUCTION OF MULTILAYER COATS OF PAINT

CROSS REFERENCE TO RELATED APPLICATIONS

This application is a National Phase Application of Patent Application PCT/EP2008/003937 filed on May 16, 2008, which claims priority to DE102007023539.0, filed May 18, 2007, both of which are hereby incorporated by reference.

FIELD OF THE INVENTION

The present invention relates to aqueous, pigmented coating compositions, to their preparation and use for producing multicoat paint systems, more particularly those having a particularly strongly pronounced light/dark behavior (metallic flop, also referred to as flop or flip-flop).

BACKGROUND OF THE INVENTION

The long-established aqueous or solventborne coating materials, especially the basecoat materials, and the multicoat effect paint systems produced using them exhibit good performance properties.

The continually growing technical and, in particular, esthetic requirements of the market, however, and particularly the requirements imposed by the automakers and their customers, are necessitating continual onward development beyond the technical and esthetic level achieved to date. Modern bodywork design, with its pronounced rounded elements, is very much in harmony with paint finishes having a strong flip-flop effect. The desire to produce an effect that mimics metal can be realized through the use of very thin aluminum leaflets, with thicknesses in the nanometer range, as are described in EP 0826745 A2, for example.

In particular there is a need for new coating compositions which make it possible to produce basecoat systems that exhibit a particularly strongly pronounced light/dark behavior. At the same time, however, the advantages achieved through the known basecoat materials and the basecoat systems produced from them should not be lost, but instead should be retained at least to the same extent and preferably to a greater extent.

The corresponding effect basecoat systems and, where appropriate, color basecoat systems as well ought therefore to exhibit no haze and to possess good leveling and also a very good overall visual appearance. The basecoats ought further to be free from film defects, light/dark shading (clouds), and gel specks. Furthermore, the resulting coatings ought not to exhibit any optical defects and ought to possess satisfactory adhesion to the clearcoat.

The coating compositions are to be distinguished, further, by good storage stability, which means no significant deterioration in the properties either of the coating compositions themselves or of the coatings produced from these coating materials when the latter are stored at 40° C. (for 28 days). Whilst there should be no deterioration in the rheological properties of the coating compositions, in particular no increase in viscosity, and no gel speck formation and no impairment of the metallic flop.

Customary aqueous basecoat materials of the prior art are easy to prepare, stable on storage, and transportable. They meet the typical requirements of automotive finishing in terms of application, technological properties (adhesion, long-term weathering), storage stability, circulation stability, and appearance.

EP 1 591 492 A1 describes for example a basecoat material comprising metal pigments which can be aqueous or solvent-based and which contains a relatively high fraction of the metal pigment—preferably 12% to 20% by weight based on the total binder content. The focus of EP 1 591 492 A1, however, is to provide systems of maximum moisture stability.

WO 2006/017197 A1 discloses a process for producing special-effect finishes but uses relatively low fractions of a leaflet-shaped metal pigment in conjunction with comparatively high amounts of binder and comparatively high solids fractions in order to produce an effect coating material, the leaflet-shaped metal pigment being accompanied in the coating material by at least one further, additional special-effect pigment.

The metallic light/dark behavior (flip-flop) of solvent-based basecoat materials of the kind used, for example, for finishing wheel rims is nevertheless to date a long way from being attained when using prior-art aqueous basecoat materials comprising effect pigments.

Factors of importance for achieving a flip-flop effect include not only use of PVD aluminum leaflets as pigments in producing metallic paint, but also the precise harmonization of the amount of the further components in the aqueous paint system.

Aqueous coating materials based on polyacrylate and polyester binders and on amino resin crosslinking agents, and comprising a leaflet-shaped aluminum effect pigment produced by PVD methods (e.g., Metalure® from Eckart), are known, but cannot yet meet all of the requirements made on them.

The object on which the present invention is based was therefore that of providing new physically, thermally and physically, and thermally curable compositions which comprise metallic pigments, which are easy to prepare, and which meet all of the requirements of present-day aqueous vehicle paints. In addition they are to have a pronounced flip-flop effect.

The coating materials ought to be suitable in particular as aqueous basecoat materials for producing effect basecoats and color and effect basecoats of multicoat paint systems. In this context they ought to exhibit excellent application behavior and outstanding leveling.

Even in extremely thin coats and in comparatively low metallic pigment concentrations, the effect basecoats and color and effect basecoats ought to show high hiding power, outstanding intercoat adhesion, particularly high condensation resistance, isotropic pigment dispersion, an especially strongly pronounced light/dark behavior (metallic flop), and also very high metallic brilliance and very high gloss. At the same time they ought to be free from film defects, such as light/dark shading (clouds) and gel specks. All in all they ought to exhibit a mirror effect very much like that of chrome, and, if they have a coloring action, ought to have a particularly elegant, full color effect with minimal sparkle effect (glitter effect).

SUMMARY OF THE INVENTION

It has been found that the above requirements are met through the provision of aqueous coating compositions which are curable physically only, thermally and physically, or thermally only, and which comprise A) at least one polyurethane selected from the group consisting of physically curable, thermally self-crosslinking and/or thermally externally crosslinking, ionically and/or nonionically stabilized polyurethanes, which are saturated, unsaturated and/or grafted with olefinically unsaturated compounds, as binder and
B) at least one leaflet-shaped metallic pigment produced by PVD (Physical Vapor Deposition) methods,
the amount of B), based on the total binder content of the coating composition, being less than 10% by weight, and the total binder content, based on the coating composition, being less than 12% by weight.

The coating compositions of the invention are also referred to below as "compositions of the invention".

The present invention further provides a process for producing the coating compositions of the invention that involves mixing the ingredients of the coating composition and homogenizing the resulting mixture. This process is referred to below as "process of the invention".

The invention additionally provides not least for the use of the compositions of the invention and of the compositions of the invention produced by the process of the invention as a coating material, more particularly as a paint, preferably as a basecoat material. This use is referred to as "use in accordance with the invention".

Additional subject matter of the invention will emerge from the description.

DETAILED DESCRIPTION OF THE INVENTION

In the light of the prior art it was surprising and unforeseeable for the skilled worker that the object on which the present invention was based could be achieved by means of the compositions of the invention, the process of the invention, and the use in accordance with the invention.

A particular surprise was that, even with sharply fluctuating temperatures, the compositions of the invention are storage-stable and transportable. Nor is there any gas evolved. Even after long shearing the compositions did not exhibit any sedimentation of metallic pigments or other constituents.

The coating materials are outstandingly suitable as aqueous basecoat materials for producing effect basecoats or color and effect basecoats of multicoat paint systems. In that application they have shown excellent application behavior and outstanding leveling.

Even in comparatively thin coats and comparatively low metallic pigment concentrations, the effect basecoats and color and effect basecoats exhibit a high hiding power, outstanding intercoat adhesion, particularly high condensation resistance, isotropic pigment distribution, an especially strongly pronounced light/dark behavior (metallic flop), a very high metallic brilliance, and very high gloss. At the same time they are free from film defects, such as light/dark shading (clouds) and gel specks. Overall, indeed, they display a mirror effect which mimics chromium, and, where they have a coloring action, possess a particularly elegant, full color effect with minimal sparkle effect (glitter effect).

The compositions of the invention comprise at least one polyurethane (A) as binder.

The polyurethane (A) is selected from the group consisting of physically curable, thermally self-crosslinking and/or thermally externally crosslinking, ionically and/or nonionically stabilized polyurethanes which are saturated, unsaturated and/or grafted with olefinically unsaturated compounds.

On the properties of "physically curable", "thermally self-crosslinking" and "thermally externally crosslinking", and on the physical prerequisites which underlie these properties, reference is made to German patent application DE 100 10 416 A1, page 3 lines 11 to 30 and page 5 lines 33 to 41, and page 5 line 47 to page 8 line 6. The elucidation given there in connection with (meth)acrylate (co)polymers applies here as well mutatis mutandis.

Preferably the polyurethane (A) is thermally externally crosslinking. The thermal crosslinking or curing may be further assisted by the physical curing of the polyurethane (A).

Polyurethane (A) can also be grafted with olefinically unsaturated compounds. The graft base used to prepare grafted polyurethanes of this kind is with particular preference an unsaturated—preferably olefinically unsaturated—polyurethane (A). With very particular preference the olefinically unsaturated polyurethane (A) contains terminal and lateral, especially lateral, olefinically unsaturated groups.

With very particular preference the polyurethane (A) is stabilized ionically, more particularly anionically. Carboxylate groups especially are used for this purpose.

Examples of suitable polyurethanes (A) are known from the German patent applications
DE 40 09 858 A1, column 6 line 18 to column 10 line 23,
DE 44 37 535 A1, page 2 line 27 to page 6 line 22,
DE 199 14 896 A1, column 4 line 26 to column 11 line 5,
DE 100 43 405 C1, column 5, paragraph [0030],
DE 199 48 004 A1, page 3 line 14 to page 13 line 48,
DE 100 53 890 A1, column 3, paragraph [0016] to column 18, paragraph [0123], or
DE 102 23 652 A1, column 3, paragraph [0019] to column 16, paragraph [0101].

The amount of polyurethane binder (A) is set so that the weight of leaflet-shaped metallic pigments (B) produced by PVD methods in the compositions of the invention, based on the total binder weight in the composition of the invention, is below 10% by weight, preferably 3% to below 10% by weight, more preferably 4% to 9% by weight, and very preferably 6% to 8% by weight. The total binder weight of the composition of the invention is composed here of the fraction of polyurethane binder(s) (A) and of further binders, such as polyester resins or polyacrylate resins, for example. The total binder content of the composition of the invention is preferably less than 12% by weight, more preferably less than 10% by weight, with particular preference 5% to 9% by weight, and with very particular preference 7% to 9% by weight, based on the total weight of the composition of the invention.

The amount of binder (A), based on the total binder content, is preferably at least 20% by weight, more preferably at least 25% by weight, or even more than 30% by weight.

The compositions of the invention comprise at least one leaflet-shaped metallic pigment (B) produced by PVD (Physical Vapor Deposition) methods. Preferably there is only one leaflet-shaped metallic pigment (B) produced by PVD methods.

In particular the leaflet-shaped metallic pigment (B) is an aluminum-effect pigment.

The PVD methods are vacuum coating methods for producing thin layers, in which the metal, more particularly aluminum, is converted into the gas phase by purely physical techniques before then being deposited on the substrate (cf. Römpp Online, Georg Thieme Verlag, 2004, "PVD methods").

Preferably the metal is applied by vapor deposition under a high vacuum to a temporary substrate to give a metal layer (B'). The temporary substrate is preferably a polymeric film. With particular preference the temporary substrate comprises an antistick layer or release layer on which the metal layer (B') is deposited.

The metal layer (B') is subsequently removed from the temporary substrate by stripping, preferably with a nonpolar organic solvent, after which the resulting metal leaflets (B") are subjected to shearing, preferably by stirring with the dispersion containing them, to give the leaflet-shaped metallic pigment (B).

The leaflet-shaped metallic pigment (B) preferably has a thickness of 20 to 80 nm and more particularly of 30 to 50 nm.

The leaflet-shaped metallic pigment (B) preferably has a maximum particle size of 20 to 50 μm and more particularly 25 to 45 μm.

The leaflet-shaped metallic pigments (B), more particularly the aluminum effect pigments (B), are products known per se and are sold, for example, by Eckart under the brand names Metalure®, Silvershine® or Hydroshine®.

The amount of the leaflet-shaped metallic pigments (B) in the compositions of the invention is guided, as described above, in particular by the total binder content. Based on the composition of the invention as a whole, the amount of (B) is preferably 0.3% to 0.9% by weight, more preferably 0.4% to 0.7% by weight.

The compositions of the invention are aqueous, which is to say that they include water, in which the above-described constituents (A) and (B) are present in dispersion or emulsion. Besides water as the principle "solvent", however, there may be quantities of organic solvents typical for aqueous coating materials. However, as far as possible, the amount of organic solvents should not exceed 18% by weight, based on the total weight of the composition of the invention. The amount of organic solvents, based on the total weight of the composition of the invention, is preferably not more than 15% by weight, more preferably in the range from 7% to 13% by weight, and very preferably is 8% to 12% by weight.

The total solids content, the amount of all non-volatile constituents, is typically not more than 14% by weight, more preferably 8% to 13% by weight, and very preferably 9% to 12% by weight, based in each case on the total weight of the composition of the invention. The total solids content can be determined, for example, by drying the composition at 120° C. for two hours.

The compositions of the invention may further comprise at least one further component (C). In the case of the use of externally crosslinking polyurethanes (A), (C) is a crosslinking agent. Also included under (C), however, are further polyurethane-free binders, present where appropriate in addition to the polyurethane binder (A), such as, for example, polyester resins or poly(meth)acrylic acid resins or poly(meth)acrylate resins.

Examples of suitable crosslinking agents (C) are known from German patent application DE 199 48 004 A1, page 14 line 32 to page 16 line 14. They are preferably used in the amounts specified there.

The compositions of the invention may not least further comprise at least one customary and known coatings additive, in effective amounts, as additive (C). Examples of suitable coatings additives (C) are known from German patent application DE 199 48 004 A1, page 16 line 15 to page 17 line 5. Other additives (C) include, for example, dyes or color pigments which are organic or inorganic.

Component (C) may also comprise effect pigments other than component (B). Since, however, the presence of further effect pigments is not necessary for the achievement of the aim of a maximum metallic flop, and may even prevent that aim being achieved, preference is given to those compositions of the invention which besides (B) contain no further effect pigments.

The compositions of the invention are preferably prepared by means of the process of the invention. That process involves dispersing the above-described constituents (A) and (B) and also, if desired, (C) in an aqueous medium, more particularly in water, and then homogenizing the resulting mixture. Viewed in terms of its method, the process of the invention has no peculiarities, but can instead be carried out using the customary and known mixing techniques and mixing assemblies, such as stirred tanks, dissolvers, agitator mills, compounders, static mixers or extruders.

In the process of the invention the leaflet-shaped metallic pigment (B) is used preferably in the form of pigment pastes. It is used in particular in the form of the pigment pastes described in German patent application DE 102 40 972 A1, page 3, paragraph [0019] to page 5, paragraph [0031], which comprise at least one leaflet-shaped metallic pigment (B) in place of or in addition to the effect pigments described in said application.

On account of the manifold particular advantages of the compositions of the invention and of the compositions prepared by means of the process of the invention, more particularly the compositions of the invention prepared by the process of the invention, they can be put to numerous end uses.

Preferably they are used as coating materials for producing single-coat and multicoat, especially multicoat, effect coatings. With particular preference they are used in that context as aqueous basecoat materials for producing effect basecoats, and also color and effect basecoats, of multicoat paint systems, preferably multicoat paint systems for motor vehicles, more particularly high-end automobiles.

With very particular preference the multicoat paint systems are produced by wet-on-wet methods which involve:
(1) applying at least one aqueous basecoat material to a primed or unprimed substrate to give at least one aqueous basecoat film (1),
(2) applying at least one clearcoat material to the aqueous basecoat film (1) to give at least one clearcoat film (2), and
(3) jointly curing at least the aqueous basecoat film(s) (1) and the clearcoat film(s) (2) to give the basecoat (1) and the clearcoat (2).

Examples of such wet-on-wet methods are known from German patent application DE 199 48 004 A1, page 17 line 37 to page 19 line 22.

In one particularly preferred embodiment the multicoat paint systems are obtainable by the primed substrate used in step (1) above being a substrate primed with a primer, the primer having been applied in an electrostatic coating process (ESTA coating). Preferably two primer coats are applied in succession by means of ESTA. The primer coat or primer coats preferably each possess a dry film thickness of 10 to 25 μm.

Where the preferably two primer coats are applied, preferably each of them possesses a dry film thickness of 10 to 25 μm, more preferably each a dry film thickness of 15 to 20 μm. In one preferred embodiment of the wet-on-wet multicoat painting procedure, subsequently, the coating material composition of the invention, comprising PVD metallic effect pigment, is applied once, preferably twice, in a dry film thickness of in each case 2 to 8 μm, more preferably 2 to 6 μm, and very preferably 3 to 5 μm. The clearcoat material applied in step (2) of the preferred embodiment is applied preferably in one coat, more preferably by means of ESTA in a dry film thickness of preferably 25 to 50 μm, more preferably 30 to 45 μm, and very preferably 35 to 40 μm.

A preferred inventive multicoat paint system produced in this way possesses, accordingly, one or two, preferably two, primer coats each with a dry film thickness of 10 to 25 μm, more preferably each 15 to 20 μm, and also one or two, preferably two, coating films of the coating material composition of the invention, applied to the sole primer coat or final primer coat, with a dry film thickness of in each case 2 to 8 μm, more preferably each 3 to 5 μm, and, lastly, a clearcoat topcoat in a dry film thickness of preferably 25 to 50 μm, more preferably 30 to 45 μm, and very preferably 35 to 40 μm. The clearcoat material employed is with particular preference a 2-component (2K) clearcoat material. In comparison to conventional paint finishes, this particularly preferred multicoat paint system possesses a significantly lower coat thickness while retaining outstanding properties. It is also obtainable in fewer working steps, and is more favorable in terms of paint consumption.

The resultant effect coatings and color and effect coatings of the invention, more particularly the multicoat paint systems of the invention, have a flop index $FL_{X\text{-}Rite}=24$ and more particular=26, in each case calculated using the X-Rite company's formula:

$$FL_{X\text{-}Rite}=2.69(L*_{15°}-L*_{110°})^{1.11}/(L*_{45°})^{0.86}.$$

Surprisingly, the respective color and effect-coatings of the invention, more particularly the multicoat paint systems of the invention, in comparison to solvent-based paint systems, no longer exhibit any instances of light/dark shading (clouds).

All in all, the effect coatings of the invention (aqueous basecoat materials C1 and C2), more particularly the multicoat paint systems of the invention, have an outstanding profile of performance properties, which is outstandingly well balanced in terms of mechanical properties, optical properties, corrosion resistance, intercoat adhesion, and substrate adhesion. Particularly noteworthy are the outstanding overall visual appearance and the particularly strongly pronounced viewing-angle-dependent light/dark behavior (metallic flop), which is attributable to the basecoat of the invention being free from film defects. The metallic flop may be so pronounced that a mirror effect mimicking chrome is obtained. Moreover, the color and effect coatings of the invention, more particularly the multicoat paint systems of the invention, exhibit particularly esthetically appearing, elegant, full color effects with minimal sparkle effect (glitter effect).

It was particularly surprising that, with a very low fraction of the leaflet-shaped metallic pigment produced by a PVD method, relative to the total binder fraction of the composition of the invention, coating compositions are obtained which exhibit a metallic flop which substantially matches that of solvent-based systems without the paint systems exhibiting the disadvantages of the solvent-based systems, such as the clouding, for example. Likewise surprising was the fact that this success occurs in the compositions of the invention despite their very low absolute total binder fraction of less than 12% by weight, typically below 10% by weight, based on the total weight of the composition, and their very low total solids fraction.

The best results are obtained if the composition of the invention complies with the preferred and/or particularly preferred ranges specified earlier on above for total binder content, amount of polyurethane binder (A), total solids content, amount of leaflet-shaped metallic pigment (B) produced by a PVD method, solvent content, and, in particular, weight ratio of (B) to total binder content.

A typical especially preferred composition of the invention therefore contains, for example:

leaflet-shaped metallic pigments (B), produced by a PVD method, in a fraction of 6% to 8% by weight, based on the total binder weight, and/or 0.4% to 0.7% by weight, based on the total weight of the composition of the invention, binder in a total amount of 7% to 9% by weight, based on the total weight of the composition of the invention, and complies, where appropriate, with one or more of the criteria below, such as a polyurethane binder (B) content of at least 30% by weight, based on the total binder content, a total solids content of 9% to 12% by weight (nonvolatile constituents, 120° C., 2 h), and an organic solvent content of 8% to 12% by weight, based on the total weight of the composition.

Each of the ranges specified in the typical particularly preferred composition can of course be extended within the limits of the invention. Thus each individual one of the stated ranges can be replaced by a further inventive range specified in the description, or may be restricted with inclusion of one of the specified upper or lower limits, without alteration to the essence of the invention. The best results, however, particularly in terms of the metallic flop of the coatings, are anticipated when the particularly preferred ranges are observed.

Eight different basecoat materials were used as systems for comparison, the aqueous basecoat materials C1 and C2 being inventive and the further aqueous basecoat materials C3 to C8 serving for comparison. The aqueous basecoat materials C1 to C3 possess a relatively low total solids content of below 11% by weight, the amount of pigment (B) (Hydroshine WS3001 from Eckart), based on the total binder weight, being 4% (C1), 7% (C2), and 10% (C3) by weight. The aqueous basecoat materials of C4 to C6, serving as a comparison, possess a solids content of more than 14% by weight, the amount of pigment (B) (Hydroshine WS3001 from Eckart), based on the total binder weight, being 4% (C4), 7% (C5), and 10% (C6) by weight. The comparative aqueous basecoat material C7 was prepared using silver dollar aluminum pigments of the Hydrolux type from Eckart, with a solids content of more than 18% by weight and a pigment content of 2.7%. Comparison coating material C8 is a solvent-based coating material prepared using PVD aluminum pigment of type Metalure L55700 from Eckart, with a solids content of below 10% by weight and a precisely set pigment content of 8% aluminum, based on total binder.

Preparation of Coating Systems C1 to C8

Aqueous Basecoat Material C1:

A stirring vessel was charged with 26 parts by weight of a thickener (paste of a sodium magnesium phyllosilicate, Laponite® RD, 3 percent in water). Added to this with stirring were 10 parts by weight of the polyurethane dispersion from German patent application DE 40 09 858 A1, column 16 lines 10 to 35, "C. Preparation of an aqueous polyurethane resin dispersion". Added to the resulting mixture with stirring was 1.0 part by weight of the commercial wetting agent Surfynol® 100 (50 percent in butylglycol). Subsequently a mixture of 1.7 parts by weight of a commercial water-dilutable melamine-formaldehyde resin (Cymel® 327) and 2.0 parts by weight of an aqueous polyester resin dispersion from German patent application DE 40 09 858 A1, column 16 lines 37 to 59, "D. Preparation of an aqueous polyester resin dispersion", 1.0 part by weight of butylglycol, 1.0 part by weight of the commercial wetting agent Surfynol® 100 (50 percent in butylglycol), and 0.1 part by weight of dimethylethanolamine (10 percent in deionized water) was added with stirring. The resulting mixture was admixed with 1.6 parts by weight of the polyurethane-modified polyacrylate resin of German patent application DE 44 37 535 A1, page 7 line 55 to page 8 line 23, "D. Preparation of the inventive polyurethane-modified polyacrylate". Added to the resulting mixture, with stirring, were 1.5 parts by weight of the commercial wetting agent Surfynol® 100 (50 percent in butylglycol), 0.2 part by weight of the commercial free-radical scavenger Tinuvin 123, 0.7 part by weight of a 50 percent strength solution of the commercial polyurethane thickener Nopco® DSX 1550 in butylglycol, and 0.3 part by weight of the commercial nonassociative thickener Viscalex® HV30 (methacrylate copolymer based on (C1-C6) alkyl (meth)acrylate and (meth)acrylic acid from German patent DE 100 43 405 C1, column 11, paragraph [0075]) and also, in portions, 43.3 parts by weight of water. The resulting mixture was admixed with a paste of 3.7 parts by weight of a leaflet-shaped aluminum effect pigment (B) produced by a PVD method (Alu-Hydroshine® WS3001 from Eckart) and 3.7 parts by weight of a mixture from German patent application DE 102 40 972 A1, page 7, paragraph [0053], composed of Viscalex® HV30, an organic amine, Surfynol® 100, the nonionic surfactant Hydropalat® 3037 from Cognis and water.

The resulting mixture was homogenized to give the aqueous basecoat material C1.

For application, the aqueous basecoat material C1 was adjusted with a ten percent strength aqueous dimethylethanolamine solution and deionized water to a pH of 7.8 to 8.2 and to an application viscosity of 30-40 mPas at 23° C. and a shear rate of 1000 s$^{-1}$.

Aqueous Basecoat Material C2:

A stirring vessel was charged with 26 parts by weight of a thickener (paste of a sodium magnesium phyllosilicate, Laponite® RD, 3 percent in water). Added to this with stirring were 10 parts by weight of the polyurethane dispersion from German patent application DE 40 09 858 A1, column 16 lines 10 to 35, "C. Preparation of an aqueous polyurethane resin dispersion". Added to the resulting mixture with stirring was 1.0 part by weight of the commercial wetting agent Surfynol® 100 (50 percent in butylglycol). Subsequently a mixture of 1.7 parts by weight of a commercial water-dilutable melamine-formaldehyde resin (Cymel® 327) and 2.0 parts by weight of an aqueous polyester resin dispersion from German patent application DE 40 09 858 A1, column 16 lines 37 to 59, "D. Preparation of an aqueous polyester resin dispersion", 1.0 part by weight of butylglycol, 1.0 part by weight of the commercial wetting agent Surfynol® 100 (50 percent in butylglycol), and 0.1 part by weight of dimethylethanolamine (10 percent in deionized water) was added with stirring. The resulting mixture was admixed with 1.6 parts by weight of the polyurethane-modified polyacrylate resin of German patent application DE 44 37 535 A1, page 7 line 55 to page 8 line 23, "D. Preparation of the inventive polyurethane-modified polyacrylate". Added to the resulting mixture, with stirring, were 1.5 parts by weight of the commercial wetting agent Surfynol® 100 (50 percent in butylglycol), 0.2 part by weight of the commercial free-radical scavenger Tinuvin 123, 0.7 part by weight of a 50 percent strength solution of the commercial polyurethane thickener Nopco® DSX 1550 in butylglycol, and 0.3 part by weight of the commercial nonassociative thickener Viscalex® HV30 (methacrylate copolymer based on (C1-C6) alkyl (meth)acrylate and (meth)acrylic acid from German patent DE 100 43 405 C1, column 11, paragraph [0075]) and also, in portions, 39.5 parts by weight of water. The resulting mixture was admixed with a paste of 5.6 parts by weight of a leaflet-shaped aluminum effect pigment (B) produced by a PVD method (Alu-Hydroshine® WS3001 from Eckart) and 5.6 parts by weight of a mixture from German patent application DE 102 40 972 A1, page 7, paragraph [0053], composed of Viscalex® HV30, an organic amine, Surfynol® 100, the nonionic surfactant Hydropalat® 3037 from Cognis and water.

The resulting mixture was homogenized to give the aqueous basecoat material C2.

For application, the aqueous basecoat material C2 was adjusted with a ten percent strength aqueous dimethylethanolamine solution and deionized water to a pH of 7.8 to 8.2 and to an application viscosity of 30-40 mPas at 23° C. and a shear rate of 1000 s$^{-1}$.

Aqueous basecoat material C3 (comparative experiment):

A stirring vessel was charged with 26 parts by weight of a thickener (paste of a sodium magnesium phyllosilicate, Laponite® RD, 3 percent in water). Added to this with stirring were 10 parts by weight of the polyurethane dispersion from German patent application DE 40 09 858 A1, column 16 lines 10 to 35, "C. Preparation of an aqueous polyurethane resin dispersion". Added to the resulting mixture with stirring was 1.0 part by weight of the commercial wetting agent Surfynol® 100 (50 percent in butylglycol). Subsequently a mixture of 1.7 parts by weight of a commercial water-dilutable melamine-formaldehyde resin (Cymel® 327) and 2.0 parts by weight of an aqueous polyester resin dispersion from German patent application DE 40 09 858 A1, column 16 lines 37 to 59, "D. Preparation of an aqueous polyester resin dispersion", 1.0 part by weight of butylglycol, 1.0 part by weight of the commercial wetting agent Surfynol® 100 (50 percent in butylglycol), and 0.1 part by weight of dimethylethanolamine (10 percent in deionized water) was added with stirring. The resulting mixture was admixed with 1.6 parts by weight of the polyurethane-modified polyacrylate resin of German patent application DE 44 37 535 A1, page 7 line 55 to page 8 line 23, "D. Preparation of the inventive polyurethane-modified polyacrylate". Added to the resulting mixture, with stirring, were 1.5 parts by weight of the commercial wetting agent Surfynol® 100 (50 percent in butylglycol), 0.2 part by weight of the commercial free-radical scavenger Tinuvin 123, 0.7 part by weight of a 50 percent strength solution of the commercial polyurethane thickener Nopco® DSX 1550 in butylglycol, and 0.3 part by weight of the commercial nonassociative thickener Viscalex® HV30 (methacrylate copolymer based on (C1-C6) alkyl (meth)acrylate and (meth)acrylic acid from German patent DE 100 43 405 C1, column 11, paragraph [0075]) and also, in portions, 33.7 parts by weight of water. The resulting mixture was admixed with a paste of 8.5 parts by weight of a leaflet-shaped aluminum effect pigment (B) produced by a PVD method (Alu-Hydroshine® WS3001 from Eckart) and 8.5 parts by weight of a mixture from German patent application DE 102 40 972 A1, page 7, paragraph [0053], composed of Viscalex® HV30, an organic amine, Surfynol® 100, the nonionic surfactant Hydropalat® 3037 from Cognis and water.

The resulting mixture was homogenized to give the aqueous basecoat material C3.

For application, the aqueous basecoat material C3 was adjusted with a ten percent strength aqueous dimethylethanolamine solution and deionized water to a pH of 7.8 to 8.2 and to an application viscosity of 30-40 mPas at 23° C. and a shear rate of 1000 s⁻¹.

Aqueous Basecoat Material C4 (Comparative Experiment):

A stirring vessel was charged with 24 parts by weight of a thickener (paste of a sodium magnesium phyllosilicate, Laponite® RD, 3 percent in water). Added to this with stirring were 19 parts by weight of the polyurethane dispersion from German patent application DE 40 09 858 A1, column 16 lines 10 to 35, "C. Preparation of an aqueous polyurethane resin dispersion". Added to the resulting mixture with stirring was 0.9 part by weight of the commercial wetting agent Surfynol® 100 (50 percent in butylglycol). Subsequently a mixture of 3.2 parts by weight of a commercial water-dilutable melamine-formaldehyde resin (Cymel® 327) and 1.0 part by weight of an aqueous polyester resin dispersion from German patent application DE 40 09 858 A1, column 16 lines 37 to 59, "D. Preparation of an aqueous polyester resin dispersion", 2.0 parts by weight of butylglycol, 0.9 part by weight of the commercial wetting agent Surfynol® 100 (50 percent in butylglycol), and 0.2 part by weight of dimethylethanolamine (10 percent in deionized water) was added with stirring. The resulting mixture was admixed with 3.0 parts by weight of the polyurethane-modified polyacrylate resin of German patent application DE 44 37 535 A1, page 7 line 55 to page 8 line 23, "D. Preparation of the inventive polyurethane-modified polyacrylate". Added to the resulting mixture, with stirring, were 0.9 part by weight of the commercial wetting agent Surfynol® 100 (50 percent in butylglycol), 1.2 parts by weight of a 50 percent strength solution of the commercial polyurethane thickener Nopco® DSX 1550 in butylglycol, and 0.5 part by weight of the commercial nonassociative thickener Viscalex® HV30 (methacrylate copolymer based on (C1-C6) alkyl (meth)acrylate and (meth)acrylic acid from German patent DE 100 43 405 C1, column 11, paragraph [0075]) and also, in portions, 29.0 parts by weight of water. The resulting mixture was admixed with a paste of 5.0 parts by weight of a leaflet-shaped aluminum effect pigment (B) produced by a PVD method (Alu-Hydroshine® WS3001 from Eckart) and 5.0 parts by weight of a mixture from German patent application DE 102 40 972 A1, page 7, paragraph [0053], composed of Viscalex® HV30, an organic amine, Surfynol® 100, the nonionic surfactant Hydropalat® 3037 from Cognis and water.

The resulting mixture was homogenized to give the aqueous basecoat material C4.

For application, the aqueous basecoat material C4 was adjusted with a ten percent strength aqueous dimethylethanolamine solution and deionized water to a pH of 7.8 to 8.2 and to an application viscosity of 40-50 mPas at 23° C. and a shear rate of 1000 s⁻¹.

Aqueous Basecoat Material C5 (Comparative Experiment):

A stirring vessel was charged with 24 parts by weight of a thickener (paste of a sodium magnesium phyllosilicate, Laponite® RD, 3 percent in water). Added to this with stirring were 19 parts by weight of the polyurethane dispersion from German patent application DE 40 09 858 A1, column 16 lines 10 to 35, "C. Preparation of an aqueous polyurethane resin dispersion". Added to the resulting mixture with stirring was 0.9 part by weight of the commercial wetting agent Surfynol® 100 (50 percent in butylglycol). Subsequently a mixture of 3.2 parts by weight of a commercial water-dilutable melamine-formaldehyde resin (Cymel® 327) and 1.0 part by weight of an aqueous polyester resin dispersion from German patent application DE 40 09 858 A1, column 16 lines 37 to 59, "D. Preparation of an aqueous polyester resin dispersion", 2.0 parts by weight of butylglycol, 0.9 part by weight of the commercial wetting agent Surfynol® 100 (50 percent in butylglycol), and 0.2 part by weight of dimethylethanolamine (10 percent in deionized water) was added with stirring. The resulting mixture was admixed with 3.0 parts by weight of the polyurethane-modified polyacrylate resin of German patent application DE 44 37 535 A1, page 7 line 55 to page 8 line 23, "D. Preparation of the inventive polyurethane-modified polyacrylate". Added to the resulting mixture, with stirring, were 0.9 part by weight of the commercial wetting agent Surfynol® 100 (50 percent in butylglycol), 1.2 parts by weight of a 50 percent strength solution of the commercial polyurethane thickener Nopco® DSX 1550 in butylglycol, and 0.5 part by weight of the commercial nonassociative thickener Viscalex® HV30 (methacrylate copolymer based on (C1-C6) alkyl (meth)acrylate and (meth)acrylic acid from German patent DE 100 43 405 C1, column 11, paragraph [0075]) and also, in portions, 21.0 parts by weight of water. The resulting mixture was admixed with a paste of 9.0 parts by weight of a leaflet-shaped aluminum effect pigment (B) produced by a PVD method (Alu-Hydroshine® WS3001 from Eckart) and 9.0 parts by weight of a mixture from German patent application DE 102 40 972 A1, page 7, paragraph [0053], composed of Viscalex® HV30, an organic amine, Surfynol® 100, the nonionic surfactant Hydropalat® 3037 from Cognis and water.

The resulting mixture was homogenized to give the aqueous basecoat material C5.

For application, the aqueous basecoat material C5 was adjusted with a ten percent strength aqueous dimethylethanolamine solution and deionized water to a pH of 7.8 to 8.2 and to an application viscosity of 40-50 mPas at 23° C. and a shear rate of 1000 s⁻¹.

Aqueous Basecoat Material C6 (Comparative Experiment):

A stirring vessel was charged with 24 parts by weight of a thickener (paste of a sodium magnesium phyllosilicate, Laponite® RD, 3 percent in water). Added to this with stirring were 19 parts by weight of the polyurethane dispersion from German patent application DE 40 09 858 A1, column 16 lines 10 to 35, "C. Preparation of an aqueous polyurethane resin dispersion". Added to the resulting mixture with stirring was 0.9 part by weight of the commercial wetting agent Surfynol® 100 (50 percent in butylglycol). Subsequently a mixture of 3.2 parts by weight of a commercial water-dilutable melamine-formaldehyde resin (Cymel® 327) and 1.0 part by weight of an aqueous polyester resin dispersion from German patent application DE 40 09 858 A1, column 16 lines 37 to 59, "D. Preparation of an aqueous polyester resin dispersion", 2.0 parts by weight of butylglycol, 0.9 part by weight of the commercial wetting agent Surfynol® 100 (50 percent in butylglycol), and 0.2 part by weight of dimethylethanolamine (10 percent in deionized water) was added with stirring. The resulting mixture was admixed with 3.0 parts by weight of the polyurethane-modified polyacrylate resin of German patent application DE 44 37 535 A1, page 7 line 55 to page 8 line 23, "D. Preparation of the inventive polyurethane-modified polyacrylate". Added to the resulting mixture, with stirring, were 0.9 part by weight of the commercial wetting agent Surfynol® 100 (50 percent in butylglycol), 1.2 parts by weight of a 50 percent strength solution of the commercial polyurethane thickener Nopco® DSX 1550 in butylglycol, and 0.5 part by weight of the commercial nonassociative thickener Viscalex® HV30 (methacrylate copolymer based on (C1-C6) alkyl (meth)acrylate and (meth)acrylic acid from German patent DE 100 43 405 C1, column 11, paragraph

[0075]) and also, in portions, 21.0 parts by weight of water. The resulting mixture was admixed with a paste of 13.0 parts by weight of a leaflet-shaped aluminum effect pigment (B) produced by a PVD method (Alu-Hydroshine® WS3001 from Eckart) and 13.0 parts by weight of a mixture from German patent application DE 102 40 972 A1, page 7, paragraph [0053], composed of Viscalex® HV30, an organic amine, Surfynol® 100, the nonionic surfactant Hydropalat® 3037 from Cognis and water.

The resulting mixture was homogenized to give the aqueous basecoat material C6.

For application, the aqueous basecoat material C6 was adjusted with a ten percent strength aqueous dimethylethanolamine solution and deionized water to a pH of 7.8 to 8.2 and to an application viscosity of 40-50 mPas at 23° C. and a shear rate of 1000 s$^{-1}$.

Aqueous Basecoat Material C7 (Comparative Experiment):

A stirring vessel was charged with 23.2 parts by weight of Laponite® RD. Added to this with stirring were 20.5 parts by weight of the polyurethane dispersion from German patent application DE 40 09 858 A1, column 16 lines 10 to 35, "C. Preparation of an aqueous polyurethane resin dispersion". Subsequently a mixture of 3.7 parts by weight of Cymel® 327 and 1.0 part by weight of an aqueous polyester resin dispersion from German patent application DE 40 09 858 A1, column 16 lines 37 to 59, "D. Preparation of an aqueous polyester resin dispersion", 2.0 parts by weight of butylglycol, and 0.2 part by weight of dimethylethanolamine (10 percent in deionized water) was added with stirring. The resulting mixture was admixed with 3.7 parts by weight of the polyurethane-modified polyacrylate resin of German patent application DE 44 37 535 A1, page 7 line 55 to page 8 line 23, "D. Preparation of the inventive polyurethane-modified polyacrylate". Added to the resulting mixture, with stirring, were 1.0 part by weight of polypropylene glycol (number-average molecular weight: 900 daltons), 2.3 parts by weight of isobutanol, 3.0 parts by weight of 2-ethylhexanol, 2.1 parts by weight of n-propoxypropanol, 1.6 parts by weight of butoxypropanol, 1.0 part by weight of a modified polydimethylsiloxane, 0.66 part by weight of the 50 percent strength solution of the commercial polyurethane thickener Nopco® DSX 1550 in butylglycol, and 0.65 part by weight of the commercial thickener Viscalex® HV30 and also, in portions, 20 parts by weight of water. The resulting mixture was admixed with an aluminum effect pigment paste of 3.6 parts by weight of a Alu-Hydrolux® 612 from Eckart, 0.5 part by weight of Alu-Hydrolux® 2154 from Eckart, 3.4 parts by weight of the polyester resin dispersion from German patent application DE 40 09 858 A1, column 16, lines 37 to 59, "D. Preparation of an aqueous polyester resin dispersion", 4.0 parts by weight of butylglycol, and 0.5 part by weight of dimethylethanolamine (10 percent in deionized water), with stirring.

The resulting mixture was homogenized to give the aqueous basecoat material C7.

The aqueous basecoat material C7 was adjusted with a ten percent strength aqueous dimethylethanolamine solution and deionized water to a pH of 7.8 to 8.2 and to an application viscosity of 90-100 mPas at 23° C. and a shear rate of 1000 s$^{-1}$.

Solventborne Coating Material C8 (comparative experiment):

A stirring vessel was charged with 22.2 parts by weight of a CAB solution. Added to this with stirring were 2.8 parts by weight of a polyester resin dispersion. Added to the resulting mixture with stirring were 2.8 parts by weight of a commercial melamine-formaldehyde resin (Maprenal® MF900) and 6.2 parts by weight of a leaflet-shaped aluminum effect pigment (B) produced by a PVD method (Alu-Metalure® L55700 from Eckart). Subsequently, with stirring, 8.3 parts by weight of butylglycol acetate, 2.6 parts by weight of butyl acetate, 11.5 parts by weight of solvent naphtha, 10.6 parts by weight of diacetone alcohol, and 33 parts by weight of methoxypropyl acetate were added.

The resulting mixture was homogenized to give the solventborne basecoat material C8. For application, the solventborne basecoat material C8 was adjusted with butyl acetate to an application viscosity of 20-30 sec (Ford Cup 4 at 23° C.).

The Production of Multicoat Paint Systems 1 to 8

Multicoat paint systems 1 to 8 were produced using basecoat materials C1 to C8.

Multicoat Paint System 1:

Metal bodywork panels measuring 30 times 70 cm, which had already been coated with a customary and known, cathodically deposited, and baked electrocoat, were coated with a commercial water-based surfacer from BASF Coatings AG, after which the resulting surfacer films were flashed off at 20° C. and a relative humidity of 65% for 5 minutes and baked in a forced-air oven at 140° C. for 20 minutes. After the bodywork panels had cooled to 20° C., the aqueous basecoat material C1 was applied in two spray passes. The first application took place pneumatically (distance: 0.5 m; paint outflow rate: 300 l/min (STP); atomizer air quantity: 320 l/min (STP); atomizer air pressure: 4.8 bar; horn air quantity: 380 l/min (STP); horn air pressure: 5.2 bar), corresponding to a dry film thickness of 2 to 3 µm. The first application was then flashed off at 20° C. and a relative humidity of 65% for 2 minutes. The second application likewise took place pneumatically under the conditions specified above, corresponding to a dry film thickness of 2 to 3 µm. Subsequently the aqueous basecoat films were dried at 80° C. for 10 minutes. After the bodywork had cooled to 20° C., the aqueous basecoat films were overcoated with a commercial two-component clearcoat material from BASF Coatings AG, corresponding to a dry film thickness of 40 µm. Thereafter the surfacer films, aqueous basecoat films, and clearcoat films were baked jointly at 140° C. for 30 minutes. After sanding of the clearcoats, a commercial scratch-resistant two-component clearcoat material from PPG was applied and was baked at 140° C. for 30 minutes, to give the multicoat paint system 1.

Multicoat Paint System 2:

Metal bodywork panels measuring 30 times 70 cm, which had already been coated with a customary and known, cathodically deposited, and baked electrocoat, were coated with a commercial water-based surfacer from BASF Coatings AG, after which the resulting surfacer films were flashed off at 20° C. and a relative humidity of 65% for 5 minutes and baked in a forced-air oven at 140° C. for 20 minutes. After the bodywork panels had cooled to 20° C., the aqueous basecoat material C2 was applied in two spray passes. The first application took place pneumatically (distance: 0.5 m; paint outflow rate: 300 l/min (STP); atomizer air quantity: 320 l/min (STP); atomizer air pressure: 4.8 bar; horn air quantity: 380 l/min (STP); horn air pressure: 5.2 bar), corresponding to a dry film thickness of 2 to 3 µm. The first application was then flashed off at 20° C. and a relative humidity of 65% for 2 minutes. The second application likewise took place pneumatically under the conditions specified above, corresponding to a dry film thickness of 2 to 3 µm. Subsequently the aqueous basecoat films were dried at 80° C. for 10 minutes. After the bodywork had cooled to 20° C., the aqueous basecoat films were overcoated with a commercial two-component clearcoat material from BASF Coatings AG, corresponding to a dry film thickness of 40 µm. Thereafter the surfacer films, aqueous basecoat films, and clearcoat films were baked jointly at 140° C. for 30 minutes. After sanding of the clearcoats, a commercial scratch-resistant two-component clearcoat material from PPG was applied and was baked at 140° C. for 30 minutes, to give the multicoat paint system 2.

Multicoat Paint System 3:

Metal bodywork panels measuring 30 times 70 cm, which had already been coated with a customary and known, cathodically deposited, and baked electrocoat, were coated with a commercial water-based surfacer from BASF Coatings AG, after which the resulting surfacer films were flashed off at 20° C. and a relative humidity of 65% for 5 minutes and baked in a forced-air oven at 140° C. for 20 minutes. After the bodywork panels had cooled to 20° C., the aqueous basecoat material C3 was applied in two spray passes. The first application took place pneumatically (distance: 0.5 m; paint outflow rate: 300 l/min (STP); atomizer air quantity: 320 l/min (STP); atomizer air pressure: 4.8 bar; horn air quantity: 380 l/min (STP); horn air pressure: 5.2 bar), corresponding to a dry film thickness of 2 to 3 µm. The first application was then flashed off at 20° C. and a relative humidity of 65% for 2 minutes. The second application likewise took place pneumatically under the conditions specified above, corresponding to a dry film thickness of 2 to 3 µm. Subsequently the aqueous basecoat films were dried at 80° C. for 10 minutes. After the bodywork had cooled to 20° C., the aqueous basecoat films were overcoated with a commercial two-component clearcoat material from BASF Coatings AG, corresponding to a dry film thickness of 40 µm. Thereafter the surfacer films, aqueous basecoat films, and clearcoat films were baked jointly at 140° C. for 30 minutes. After sanding of the clearcoats, a commercial scratch-resistant two-component clearcoat material from PPG was applied and was baked at 140° C. for 30 minutes, to give the multicoat paint system 3.

Multicoat Paint System 4:

Metal bodywork panels measuring 30 times 70 cm, which had already been coated with a customary and known, cathodically deposited, and baked electrocoat, were coated with a commercial water-based surfacer from BASF Coatings AG, after which the resulting surfacer films were flashed off at 20° C. and a relative humidity of 65% for 5 minutes and baked in a forced-air oven at 140° C. for 20 minutes. After the bodywork panels had cooled to 20° C., the aqueous basecoat material C4 was applied in two spray passes. The first application took place pneumatically (distance: 0.5 m; paint outflow rate: 300 l/min (STP); atomizer air quantity: 320 l/min (STP); atomizer air pressure: 4.8 bar; horn air quantity: 380 l/min (STP); horn air pressure: 5.2 bar), corresponding to a dry film thickness of 2 to 3 µm. The first application was then flashed off at 20° C. and a relative humidity of 65% for 2 minutes. The second application likewise took place pneumatically under the conditions specified above, corresponding to a dry film thickness of 2 to 3 µm. Subsequently the aqueous basecoat films were dried at 80° C. for 10 minutes. After the bodywork had cooled to 20° C., the aqueous basecoat films were overcoated with a commercial two-component clearcoat material from BASF Coatings AG, corresponding to a dry film thickness of 40 µm. Thereafter the surfacer films, aqueous basecoat films, and clearcoat films were baked jointly at 140° C. for 30 minutes. After sanding of the clearcoats, a commercial scratch-resistant two-component clearcoat material from PPG was applied and was baked at 140° C. for 30 minutes, to give the multicoat paint system 4.

Multicoat Paint System 5:

Metal bodywork panels measuring 30 times 70 cm, which had already been coated with a customary and known, cathodically deposited, and baked electrocoat, were coated with a commercial water-based surfacer from BASF Coatings AG, after which the resulting surfacer films were flashed off at 20° C. and a relative humidity of 65% for 5 minutes and baked in a forced-air oven at 140° C. for 20 minutes. After the bodywork panels had cooled to 20° C., the aqueous basecoat material C5 was applied in two spray passes. The first application took place pneumatically (distance: 0.5 m; paint outflow rate: 300 l/min (STP); atomizer air quantity: 320 l/min (STP); atomizer air pressure: 4.8 bar; horn air quantity: 380 l/min (STP); horn air pressure: 5.2 bar), corresponding to a dry film thickness of 2 to 3 µm. The first application was then flashed off at 20° C. and a relative humidity of 65% for 2 minutes. The second application likewise took place pneumatically under the conditions specified above, corresponding to a dry film thickness of 2 to 3 µm. Subsequently the aqueous basecoat films were dried at 80° C. for 10 minutes. After the bodywork had cooled to 20° C., the aqueous basecoat films were overcoated with a commercial two-component clearcoat material from BASF Coatings AG, corresponding to a dry film thickness of 40 µm. Thereafter the surfacer films, aqueous basecoat films, and clearcoat films were baked jointly at 140° C. for 30 minutes. After sanding of the clearcoats, a commercial scratch-resistant two-component clearcoat material from PPG was applied and was baked at 140° C. for 30 minutes, to give the multicoat paint system 5.

Multicoat Paint System 6:

Metal bodywork panels measuring 30 times 70 cm, which had already been coated with a customary and known, cathodically deposited, and baked electrocoat, were coated with a commercial water-based surfacer from BASF Coatings AG, after which the resulting surfacer films were flashed off at 20° C. and a relative humidity of 65% for 5 minutes and baked in a forced-air oven at 140° C. for 20 minutes. After the bodywork panels had cooled to 20° C., the aqueous basecoat material C6 was applied in two spray passes. The first application took place pneumatically (distance: 0.5 m; paint outflow rate: 300 l/min (STP); atomizer air quantity: 320 l/min (STP); atomizer air pressure: 4.8 bar; horn air quantity: 380 l/min (STP); horn air pressure: 5.2 bar), corresponding to a dry film thickness of 2 to 3 µm. The first application was then flashed off at 20° C. and a relative humidity of 65% for 2 minutes. The second application likewise took place pneumatically under the conditions specified above, corresponding to a dry film thickness of 2 to 3 µm. Subsequently the aqueous basecoat films were dried at 80° C. for 10 minutes. After the bodywork had cooled to 20° C., the aqueous basecoat films were overcoated with a commercial two-component clearcoat material from BASF Coatings AG, corresponding to a dry film thickness of 40 µm. Thereafter the surfacer films, aqueous basecoat films, and clearcoat films were baked jointly at 140° C. for 30 minutes. After sanding of the clearcoats, a commercial scratch-resistant two-component clearcoat material from PPG was applied and was baked at 140° C. for 30 minutes, to give the multicoat paint system 6.

Multicoat Paint System 7:

Metal bodywork panels measuring 30 times 70 cm, which had already been coated with a customary and known, cathodically deposited, and baked electrocoat, were coated with a commercial surfacer from BASF Coatings AG, after which the resulting surfacer films were flashed off at 20° C. and a relative humidity of 65% for 5 minutes and baked in a forced-air oven at 140° C. for 30 minutes. After the bodywork panels had cooled to 20° C., the aqueous basecoat material C7 was applied in two spray passes. The first application took place by means of ESTA (bell rotational speed: 45 000 min$^{-1}$; ESTA directional air: 120 l/min (STP); voltage: 65 kV; distance: 0.25 m; paint discharge rate: 170 ml/min), corresponding to a dry film thickness of 8 to 10 µm. The second application took place pneumatically (distance: 0.32 m; paint outflow rate: 540 l/min (STP); atomizer air quantity: 300 l/min (STP); atomizer air pressure: 4.8 bar; horn air quantity: 395 l/min (STP); horn air pressure: 5.2 bar), corresponding to a dry film thickness of 4 to 6 µm. The aqueous basecoat films were flashed off after the first and second applications, in each case for 2 minutes. Subsequently they were dried at 80° C. for 10 minutes. After the bodywork had cooled to 20° C., the aqueous basecoat films were overcoated with a commercial two-component clearcoat material from BASF Coatings AG, corresponding to a dry film thickness of 40 µm. Subsequently the aqueous basecoat films and clearcoat films were baked jointly at 130° C. for 30 minutes, to give the multicoat paint system 7.

Multicoat Paint System 8:

Metal bodywork panels measuring 30 times 70 cm, which had already been coated with a customary and known, cathodically deposited, and baked electrocoat, were coated with a commercial water-based surfacer from BASF Coatings AG, after which the resulting surfacer films were flashed off at 20° C. and a relative humidity of 65% for 5 minutes and baked in a forced-air oven at 140° C. for 20 minutes. The solventborne basecoat material C8 was applied to the surfacer-coated panels, warmed to 40-50° C., in two spray passes. The first application took place pneumatically (distance: 0.5 m; paint outflow rate: 300 l/min (STP); atomizer air quantity: 320 l/min (STP); atomizer air pressure: 4.8 bar; horn air quantity: 380 l/min (STP); horn air pressure: 5.2 bar), corresponding to a dry film thickness of 2 to 3 µm. The first application was then flashed off at 20° C. and a relative humidity of 65% for 2 minutes. The second application likewise took place pneumatically under the conditions specified above, corresponding to a dry film thickness of 2 to 3 µm. Subsequently the aqueous basecoat films were dried at 80° C. for 10 minutes. After the bodywork had cooled to 20° C., the aqueous basecoat films were overcoated with a commercial two-component clearcoat material from BASF Coatings AG, corresponding to a dry film thickness of 40 µm. Thereafter the surfacer films, aqueous basecoat films, and clearcoat films were baked jointly at 140° C. for 30 minutes. After sanding of the clearcoats, a commercial scratch-resistant two-component clearcoat material from PPG was applied and was baked at 140° C. for 30 minutes, to give the multicoat paint system 8.

Comparison of Multicoat Paint Systems 1 to 8:

Multicoat paint systems 1 to 8 were subjected to measurement with the aid of an X-Rite spectrophotometer (e.g., MA48 Multi-Angle Spectrophotometer). From the lightness values determined for the multicoat paint systems, for viewing angles of 15°, 45°, and 110°, it is possible to calculate the so-called X-Rite flop index in accordance with the formula $$FL_{X\text{-}Rite}=2.69(L^*_{15°}-L^*_{110°})^{1.11}/(L^*_{45°})^{0.86}.$$

The result for the multicoat paint system 2 with the aqueous basecoat material based on PVD aluminum pigments was an $FL_{X\text{-}Rite}=26$, which is virtually at the level of the multicoat paint system 8 with the solventborne basecoat material based on PVD aluminum pigments, which had an $FL_{X\text{-}Rite}=27$. The multicoat paint systems 4 to 6, with comparable pigment to binder contents but substantially higher overall solids contents, give significantly lower flop values. The multicoat paint system 7, with the aqueous basecoat material based on silver dollar aluminum pigments, with an $FL_{X\text{-}Rite}$ of 11, gives by far the lowest value.

Consequently, in the case of multicoat paint system 2, the metallic flop was very much more strongly pronounced than in the case of the multicoat paint systems 3 to 7 of comparative experiments 3 to 7. Flop values which were still just acceptable were given by multicoat paint system 1. Multicoat paint system 2 is notable among other things for a markedly reduced total solids. In addition, the amount of pigment to binder, at 7%, is situated exactly within the preferred range from 5% to 9%.

In addition, multicoat paint systems 1 to 8 were inspected under diffuse light from a distance of 2 to 3 m, in straight-on view (80°) and oblique view (40°), in terms of light/dark shading (clouds), and were given ratings accordingly (rating 1: no clouds visible; to rating 5: clouds very markedly visible). Multicoat paint systems 1 to 3 scored a rating of 2 in straight-on and oblique viewing. This meant that there were no significant clouds visible. With a rating of 3, multicoat paint systems 4 to 6 were at the same level as the reference paint system 6. Multicoat paint system 8, with a rating of 5, gave a significantly poorer cloud pattern.

To simulate the circulation stability of the aqueous basecoat materials of series 1 to 8, 750 ml of each aqueous basecoat material were introduced into a commercially customary 1 liter paint can and stirred with a helical stirrer at room temperature for 20 days. The peripheral speed was 0.1 m/s. Even after 20 days there were no deposits of particles at the bottoms of the cans. The aqueous basecoat materials were therefore outstandingly suitable for producing multicoat effect paint systems free from gel specks.

Table 1 gives an overview of the X-Rite flop index values obtained and of the lightness value $L^*_{15°}$ which is key to the formation of light/dark shading (clouds). Moreover, measurements were made of gloss and haze (20°) in accordance with DIN 67530; the leveling, using the Byk/Gardner Wave scan plus instrument (long wave=LW; short wave=SW); and the hue deviation mdE' caused by the constant condensation climate test (CCC) and also after 4000 h of WOM weathering. The results are likewise given in table 1.

TABLE 1

Key technical and performance properties of coating systems
1 to 8 and of the multicoat paint systems of series 1 to 8

| | Coating system/multicoat paint system | | | | | | | |
|---|---|---|---|---|---|---|---|---|
| | C1 | C2 | C3 | C4 | C5 | C6 | C7 | C8 |
| Basis | Water | Water | Water | Water | Water | Water | Water | Solvent |
| Aluminum type | PVD | PVD | PVD | PVD | PVD | PVD | Dollar | PVD |
| Solids [% by weight] | | <11 | | | >14 | | >18 | <11 |

TABLE 1-continued

Key technical and performance properties of coating systems
1 to 8 and of the multicoat paint systems of series 1 to 8

| | Coating system/multicoat paint system | | | | | | | |
|---|---|---|---|---|---|---|---|---|
| | C1 | C2 | C3 | C4 | C5 | C6 | C7 | C8 |
| Pigment to binder [% by weight] | 4% | 7% | 10% | 4% | 7% | 10% | 17% | 8% |
| Flop index (X-Rite) | 24 | 26 | 22 | 20 | 20 | 19 | 11 | 27 |
| Clouds [rating] | 2 | 2 | 2 | 3 | 3 | 3 | 3 | 5 |
| mdE'(10 d CCC) | 0.43 | 0.56 | 0.65 | 0.65 | 0.75 | 0.87 | 0.54 | 1.23 |
| mdE'(4000 h WOM) | 1.12 | 1.32 | 1.23 | 1.87 | 1.98 | 1.87 | 0.98 | 3.56 |
| Adhesion (4000 h WOM) | ok | ok | ok | not ok | not ok | not ok | ok | not ok |
| Circulation stability | ok | ok | ok | ok | ok | ok | ok | ok |
| Haze | 602 | 599 | 602 | 590 | 585 | 598 | 350 | 590 |
| Gloss | 104 | 103 | 102 | 103 | 102 | 101 | 88 | 102 |
| L-wave | 2.5 | 2.8 | 3.2 | 3.2 | 3.1 | 3.2 | 7.8 | 3.7 |
| S-wave | 17.4 | 17.2 | 17.8 | 16.8 | 17.4 | 17.8 | 22.3 | 16.9 |

The results compiled in table 1 underline the excellent flop effect of the inventive multicoat paint systems from C1 and C2. As a result, metallic color effects with a very elegant appearance were obtained. This was achievable in particular through a reduction in total solids to below 11 percent by weight and a reduction in the pigment content to less than 0.6 percent by weight (C2), and also through an aluminum content of 7% by weight on total binder fraction (C2).

Virtually no clouds were observed (ratings of 2). Gloss, haze, and leveling were likewise outstanding.

The multicoat paint systems of the invention are stable in terms of hue and adhesion after long-term weathering.

Consequently the multicoat paint systems of the invention, like the water-based comparative coating system C7 with silver dollar aluminum pigments, met all of the technical requirements which are imposed on a basecoat material for the automotive industry.

What is claimed is:

1. A curable aqueous coating composition comprising:
   (A) a binder comprising at least one polyurethane that is: physically curable, thermally self-crosslinking, or thermally externally crosslinking; ionically or nonionically stabilized; and saturated, unsaturated, or grafted with olefinically unsaturated compounds; and
   (B) at least one leaflet-shaped metallic pigment produced by PVD (Physical Vapor Deposition) methods having a thickness of 20 to 80 nm,
   the amount of (B), based on the total binder content of the coating composition, being from 3% to less than 10% by weight, and the total binder content, based on the coating composition, being from 5% to less than 12% by weight; and
   wherein the curable aqueous coating composition does not contain further effect pigments besides (B) the at least one leaflet-shaped metallic pigment produced by PVD.

2. The curable aqueous coating composition of claim 1, wherein upon formation of a multicoat paint system including the curable aqueous coating composition in a form that does not contain dyes or color pigments that are organic or inorganic, the multicoat paint system has a flop index $FL_{X\text{-}Rite}$ in the range of 24 to 26, calculated using the X-Rite company's formula:

$$FL_{X\text{-}Rite} = 2.69(L^*_{15°} - L^*_{110°})^{1.11}/(L^*_{45°})^{0.86}.$$

3. A curable aqueous coating composition comprising:
   (A) at least one polyurethane as a binder, wherein the polyurethane is:
   physically curable, thermally self-crosslinking, or thermally externally crosslinking; ionically or nonionically stabilized; and saturated, unsaturated, or grafted with olefinically unsaturated compounds;
   (B) at least one leaflet-shaped metallic pigment produced by PVD (Physical Vapor Deposition) methods having a thickness of 20 to 80 nm;
   the amount of (B), based on the total binder content of the coating composition, being from 3% to less than 10% by weight, the total binder content, based on the coating composition, being less than 12% by weight, and a total solids content, based on the coating composition of 7% to 14% by weight;
   wherein the curable aqueous coating composition does not contain further effect pigments besides (B) the at least one leaflet-shaped metallic pigment produced by PVD.

4. The curable aqueous coating composition of claim 3, wherein upon formation of a multicoat paint system including the curable aqueous coating composition in a form that does not contain dyes or color pigments that are organic or inorganic, the multicoat paint system has a flop index $FL_{X\text{-}Rite}$ in the range of 24 to 26, calculated using the X-Rite company's formula:

$$FL_{X\text{-}Rite} = 2.69(L^*_{15°} - L^*_{110°})^{1.11}/(L^*_{45°})^{0.86}.$$

5. A curable aqueous coating composition comprising:
   (A) a binder comprising at least one polyurethane that is: physically curable, thermally self-crosslinking, or thermally externally crosslinking; ionically or nonionically stabilized; and saturated, unsaturated, or grafted with olefinically unsaturated compounds;
   (B) at least one leaflet-shaped metallic pigment produced by PVD (Physical Vapor Deposition) methods, and
   the amount of (B), based on the total binder content of the coating composition, being from 6% to less than 10% by weight, and the total binder content, based on the coating composition, being from 5% to less than 12% by weight;
   wherein the curable aqueous coating composition does not contain further effect pigments besides (B) the at least one leaflet-shaped metallic pigment produced by PVD.

6. The curable aqueous coating composition of claim 5, wherein the leaflet-shaped metallic pigment (B) has a thickness of 20 to 80 nm.

7. The curable aqueous coating composition of claim 5, wherein the total solids content of the composition is 7% to 14% by weight.

8. The curable aqueous coating composition of claim 5, wherein upon formation of a multicoat paint system including the curable aqueous coating composition in a form that does not contain dyes or color pigments that are organic or inorganic, the multicoat paint system has a flop index FLX-Rite in the range of 24 to 26, calculated using the X-Rite company's formula:

$$FL_{X\text{-}Rite}=2.69(L^*_{15°}-L^*_{110°})^{1.11}/(L^*_{45°})^{0.86}.$$

9. A curable aqueous coating composition comprising:
(A) at least one polyurethane as a binder, wherein the polyurethane is: physically curable, thermally self-crosslinking, or thermally externally crosslinking; ionically or nonionically stabilized; and saturated, unsaturated, or grafted with olefinically unsaturated compounds;
(B) at least one leaflet-shaped metallic pigment produced by PVD (Physical Vapor Deposition) methods, and
the amount of (B), based on the total binder content of the coating composition, being from 6% to less than 10% by weight, the total binder content, based on the coating composition, being less than 12% by weight, and a total solids content, based on the coating composition of 7% to 14% by weight;
wherein the curable aqueous coating composition does not contain further effect pigments besides (B) the at least one leaflet-shaped metallic pigment produced by PVD.

10. The curable aqueous coating composition of claim 9, wherein the leaflet-shaped metallic pigment (B) has a thickness of 20 to 80 nm.

11. The curable aqueous coating composition of claim 9, wherein the total binder content, based on the coating composition, is from 5% to less than 12% by weight.

12. The curable aqueous coating composition of claim 9, wherein upon formation of a multicoat paint system including the curable aqueous coating composition in a form that does not contain dyes or color pigments that are organic or inorganic, the multicoat paint system has a flop index FLX-Rite in the range of 24 to 26, calculated using the X-Rite company's formula:

$$FL_{X\text{-}Rite}=2.69(L^*_{15°}-L^*_{110°})^{1.11}/(L^*_{45°})^{0.86}.$$

\* \* \* \* \*